United States Patent Office 3,010,795
Patented Nov. 28, 1961

3,010,795
CARBON BLACK PROCESS
George F. Friauf and Brian Thorley, Pampa, Tex., assignors to Cabot Corporation, Boston, Mass., a corporation of Delaware
No Drawing. Filed Oct. 1, 1958, Ser. No. 764,506
16 Claims. (Cl. 23—209.4)

This invention relates to improved processes for the production of carbon black, particularly those blacks, known in the trade as "furnace blacks," which are produced by thermal decomposition of fluid hydrocarbon raw materials while flowing in a continuous stream through the relatively confined high temperature reaction space of a reactor or furnace.

The furnace process for manufacturing carbon blacks has been used commercially for more than twenty years and has now become so popular that it accounts for the major proportion of all carbon black production. Although furnace blacks have been widely accepted in substitution for channel blacks, certain intrinsic aspects of their production have caused complications for the industry. For example, the pelletization of furnace blacks is considerably more difficult to accomplish than for channel blacks and, since most blacks are sold in the pelletized state, this is a very important consideration. Also, when used in rubber, there seems to be a definite tendency for furnace-type carbon blacks to be scorchy or excessively fast-curing and to cause a higher degree of heat generation in a given rubber stock during processing as well as in the finished rubber product after vulcanization than blacks made by other processes.

A second complicating factor in the industry-wide adoption of the furnace process is the broad and everchanging classes of hydrocarbon fluids which are used as raw materials in this process. These oils, tars and gases suitable as raw or "make" materials are constantly becoming more and more varied and complex in their chemical structures and compositions. Although some headway has been made in determining the effects on the properties of the carbon blacks produced from various types of molecular structures commonly encountered in the different hydrocarbon raw materials used (see, for example, Cabot British Patent No. 699,406), standardization of carbon black grades and maintenance of quality control in carbon black production remains a major problem to the industry as a whole. Thus, because of variations in the character of the crude petroleums derived from different regions as well as in the processes by which they are refined and treated, substantial differences occur between carbon black make oils and tars, even of the same general types, whether obtained from the same or different refineries. Even more fundamental differences may exist between carbon black make tars derived from entirely different sources such as from coal vs. petroleum, etc.

One of the major objectives of the present invention is to provide a new and improved process for adjusting and controlling the properties of furnace-type carbon blacks to meet prescribed and predetermined requirements. Another very important objective is to provide a simple means of compensating for variations in hydrocarbon raw materials and other important factors which would normally affect significantly the quality of the black which would otherwise be produced in a carbon black furnace unless extensive changes and alterations were made in the equipment or in the operating conditions.

A further objective of the present invention is to provide a simple process for reducing the scorching tendency of carbon blacks made by a furnace process. Still another objective is to provide a process for making furnace blacks which can be pelletized more readily. Still another objective is to provide a process of producing furnace-type carbon blacks which are superior to present furnace blacks in that they cause less heat generation during processing in a given rubber stock as well as in the finished rubber article after vulcanization.

Still other objectives and advantages of the present invention will become apparent from complete description and explanation of the invention which follow.

We have now discovered a simple yet very effective process for controlling and adjusting the properties and characteristics of carbon blacks made by the furnace process. In accordance with our process the carbon black properties can be selectively adjusted and/or the effect of changes in other variables of the process can be compensated for by merely introducing into the confined, high temperature reaction zone of the furnace in which the black is being formed suitable quantities of an alkali metal having an atomic number of less than 12. The metals included within said definition are sodium (atomic No. 11) and lithium (atomic No. 3).

The exact amount of said metal used in accordance with the teachings of this invention will depend upon which one is used (or the proportion in which the two are used in the case of mixtures) as well as upon the degree of adjustment desired in the particular properties of interest in the carbon black to be produced. However, in order to provide a significant change in any particular important property, it will generally be necessary to use the said metal at a rate of the order of at least about $10^{-4}$ times the rate by weight at which the carbon black is being formed in the process. The best balanced properties and most useful all around results are generally obtained when said metal is introduced in amounts between about 50 and about 20,000 parts by weight per million parts by weight of carbon black produced. While, strictly speaking, there is no upper limit on the rate at which said metals might conceivably be used, the maximum effect upon almost any given property of any importance will be reached by the additions of metal at a rate of less than 100,000 p.p.m. by weight of the carbon black formed and higher rates of addition will generally be avoided in order to restrict the amount of residual extraneous matter retained by the carbon black product.

The quantities of metal specified above may be made up entirely of a single one of said elements, i.e. Na or Li, or a mixture of the two. Likewise, the additive metals are effective when added in any form whatsoever, whether elemental or in chemical combination; whether in solid, liquid or vapor state; and whether dissolved or suspended in a carrier such as water, aqueous media, organic media including the hydrocarbon raw materials from which the black is being made, or suspended in vapors or gases such as the combustion air or the fuel gases which are often burned in the confined, reaction zone of the furnace in order to maintain the high temperature conditions needed to decompose the make hydrocarbon to carbon black. Generally speaking the additive metals can be handled most easily and conveniently in the form of their chemical compounds because the compounds are readily available and simplify the problem of supplying the elements themselves in uniform concentration. For example, suitable compounds containing said elements may be either inorganic such as their chlorides, sulfates, carbonates, etc., or metallo-organic such as their salts with organic acids, including the fatty acids, their metal alkyls, etc.

Often, particularly when they are used in smaller relative amounts, it is advantageous to introduce said metals in a highly diluted or extended form, since the maintenance of a uniform rate of addition and level of concentration is greatly facilitated thereby. Thus, it is often desirable to introduce them in the form of a very dilute aqueous solution of their water soluble compounds or in an analogous dilute organic solution or aqueous emulsions. Nor is it necessary, in obtaining such solutions, to start with a pure or chemically refined compound or element.

The following specific examples of particular embodiments of this invention are given only for the purpose of providing a fuller and more complete understanding of some of the operating details of the invention and methods of practising same. These examples should be considered illustrative only and not in any sense limitative on the scope of the present invention.

EXAMPLE 1

A carbon black furnace was operating on about 60 gallons per hour of an aromatic concentrate extracted from the recycle stock from a petroleum refinery cracking operation. The properties of this feed stock are given in the following table.

Feed stock properties:
    Specific gravity, 60° F./60° F _____ 1.0695
    Viscosity @ 130° F., SSU _____ 600
    Viscosity @ 210° F., SSU _____ 72
    Asphaltenes content, percent _____ 0.76
    Ash content, percent _____ 0.007
    H/C ratio _____ 1.14
    Molecular weight factor _____ 227
    Initial boiling point (ASTM) _____ ° F__ 570
    50% distilled boiling point (also cracking
        point) _____ ° F__ 663

The above tar was preheated to 500° F. and used as the carbon black make liquid by introducing it axially into the cylindrical reaction zone of the furnace through an air-atomization spray nozzle located at the center of the upstream end of said furnace. The atomized make liquid was thermally decomposed with the aid of a turbulent combustion reaction maintained by six jets of natural gas introduced through six separate orifices equally spaced concentrically around the atomization nozzle and a stream of air entering the annular space surrounding the gas jets through a spiral scroll at the same end of the furnace.

Operating in this way in said furnace the reaction zone of which consists of a short cylindrical section about 18" in diameter and 9" long followed by a second short constricted cylindrical section about 9" in diameter and 9" long and using a total of about 3000 s.c.f./hr. of natural gas and 54,000 s.c.f./hr. of air, a standard high structure type furnace black was produced at a rate of about 215 lbs./hr.

However, the resultant black when compounded in rubber gave cured stock characterized by modulus values between 120% and 130% of the control standard for the grade in question whereas values in the range of 95 to 105% of the control standard were considered desirable.

Without change in any equipment or other operating conditions, the introduction into the make liquid immediately ahead of the atomization nozzle of 2 gallons per hour of an aqueous solution of sodium chloride containing 0.116 lb. NaCl per gallon immediately reduced the rubber modulus values imparted by the resulting black to well within the desired range without causing the other rubber properties of the said black, such as ultimate tensile strength, abrasion resistance, rebound, etc., to deviate from satisfactory levels or appreciably affecting the yield and rate of production of black from the hydrocarbon feed tar fed.

A simple calculation from the above data shows that the sodium chloride solution added in the above run provided sodium to the reaction zone of the furnace at a rate of about 400 parts per million parts by weight of black formed.

The same results were obtained in the above example when the sodium chloride solution was carried into the furnace by either the air or the natural gas streams injected into the burner.

The same results were also obtained when the sodium chloride solution was itself injected directly into the reaction zone of the furnace.

Substantially the same benefits can be obtained in the above example by using in place of the sodium chloride solution a dilute aqueous solution of LiCl in amounts sufficient to provide lithium to the reaction zone of the furnace at a rate of about 1600 parts Li per million parts by weight of carbon black produced therein.

Furthermore, all of the blacks made with the metal additives specified above were more easily pelletized and formed pellets much more rapidly in given equipment than the control black made without additives but otherwise made and handled under the same conditions. The blacks made with the specified metal additives also tended to be slower curing and less scorchy than the control black.

Whereas Example 1 above illustrates the use of this invention as a simple way to make quality adjustments or compensate for changeable factors which would otherwise require relatively difficult adjustments in equipment or process operating conditions, the following example demonstrates how major shifts in carbon black character can also be achieved without major change in equipment or operating conditions through the practice of this invention.

EXAMPLE 2

The carbon black furnace of Example 1 was again operated on the same feed tar under the same general set of conditions both with and without the addition of about 2 gallons per hour of an aqueous solution of sodium hydroxide containing 0.5 lb. NaOH per gallon. As will be seen from the following table the nature of the black produced is changed dramatically by the addition of this amount of sodium metal, which is equivalent to about 2670 parts Na per million parts by weight of carbon black formed.

*Comparison of blacks*

| Black sample | Analytical properties | | | | Rubber properties [1] | | | |
|---|---|---|---|---|---|---|---|---|
| | Nig. scale | Tint str. | Surf. area m.²/gm. | Oil abs. cc./gm. | Tens. str. percent std. | 300% mod. percent std. | Angle abrasion percent std. | Rebound percent std. |
| Control | 87.0 | 237 | 109 | 1.75 | 101 | 122 | 105 | 99.5 |
| With NaOH | 87.2 | 260 | 100 | 1.10 | 107 | 79 | 100 | 96.3 |

[1] Tested at 50 part loading in SBR-1000 polymer using standard recipe and curing cycle.

The lowered modulus properties in rubber of the black made in the presence of sodium greatly broadens its usefulness compared to the control blacks. For example it permits the use of higher loadings of black in a given polymer to produce a rubber stock of a given type without causing excessive heat generation or other processing or operating difficulties. Alternatively when used at the same loadings as the control black, the modified black of the instant invention produces softer stocks with greater freedom from flex cracking and heat buildup problems.

The same results are obtained in the above example when using amounts of sodium equal to that specified but adding it in other forms, e.g. as NaOH in methanol solution, as sodium acetate or sodium iodide solution in water or alcohol, as sodium carbonate in aqueous solution, as sodium oleate in solution in water or alcohol, etc.

EXAMPLE 3

In a twin generator thermal-type carbon black furnace wherein the make hydrocarbon is exposed to cracking temperatures provided by the hot refractory surfaces in one generator while the other generator is being heated to cracking temperatures by burning off-gases therein, natural gas diluted with reformed gas (principally $H_2$) was used as the make hydrocarbon stream. Operating the unit at the natural gas concentration and flow rates required to maintain the surface area and tinting strength specified for "fine thermal grade" carbon black tended to produce black the modulus properties of which in rubber were higher than desired. For example the 400% modulus imparted to natural rubber by a 50 par loading of the said black in a standard recipe after a 45 minute cure averaged 1630 p.s.i.

Without change in any of the equipment or other conditions of operation of the unit, the injection into the 1300 s.c.f. per minute stream of natural gas entering the generator of about 0.25 gallon per minute of an aqueous solution of sodium hydroxide containing 0.07 lb. NaOH per gallon immediately reduced the 400% modulus rating of the resulting black when tested in the above mentioned natural rubber recipe to about 1500 p.s.i. without causing the remaining rubber properties of the black to deviate from satisfactory levels. In fact, the surface area and tinting strength of the black produced during the addition of the sodium hydroxide solution tended to be higher than the black previously produced from the same unit and, at the same time, the production rate of the unit was maintained at about 19 lbs. black per minute.

From the above data the amount of sodium provided to the generator by the NaOH solution added amounted to 530 parts Na per million parts of weight of black collected.

Substantially the same results are obtained in the above example if the sodium hydroxide solution is introduced into the preheated generator by way of the stream of reformed gas used to dilute the natural gas make stream instead of by way of the natural gas make stream itself.

The above examples, while broadly representative of the types of improvements and accomplishments which can be achieved through the practice of the present invention, still embody only a few of the countless possible combinations and permutations of variables involved in making carbon blacks according to the modified furnace processes of the present invention. In addition to those explicitly stated above, many other possible substitutions (e.g. in feed material, furnace reaction zone design, form of introduction of the metal additive, type of carrier, etc.), as well as alternative conditions of operation which would constitute, in effect, other specific concrete embodiments of the invention will be obvious to those skilled in the art. In fact, we have found that some of the advantages of this invention are always obtained regardless of the exact type of hydrocarbon make fluid used or other details of operation provided only that the concentration of additive metal is maintained at at least about 50 p.p.m. parts of carbon black produced and that the thermal decomposition of the hydrocarbon feed is conducted in a confined reaction zone.

However, we have been unable to obtain such advantages using the same amounts of said additive metals in a conventional open-flame, impingement-type carbon black process, presumably because the heat losses in such processes are too great to permit either sodium or lithium to exert their potential effects on the carbon forming reaction.

Although as previously stated and as illustrated by the above examples the present invention is effective with any type of hydrocarbon make material when thermally decomposed in a carbon forming reaction zone, the results achieved through the practice of this invention are certainly most striking when the hydrocarbon make material is a highly aromatic liquid fraction since such liquid raw materials normally tend to produce carbon blacks having relatively high modulus properties in rubber. Since major improvements offered by the present invention are, therefore, the very ones likely to be needed most when such liquid hydrocarbons are used as raw materials, and since these said liquid hydrocarbon fractions otherwise tend to produce carbon blacks of the very highest quality, they constitute the preferred feed stocks for use in the present invention.

Having disclosed our invention together with preferred embodiments thereof what we claim and desire to secure by U.S. Letters Patent is:

1. In a process for making carbon black by the thermal decomposition of a fluid hydrocarbon flowing through an enclosed high temperature, carbon forming reaction zone, the improvement which comprises controlling important rubber properties of the carbon black produced by continuously introducing at a controlled rate into said carbon forming reaction zone a substance comprising an alkali metal having an atomic number of less than 12 in amounts sufficient to provide at least 50 parts by weight of said alkali metal per million parts of carbon black being produced, said proportion of alkali metal being directly related to the degree of adjustment needed in said rubber properties.

2. The improvement described in claim 1 in which the alkali metal is provided in amounts of not less than about 100 parts by weight per million parts of carbon black produced.

3. The improvement of claim 2 in which the alkali metal is sodium.

4. The improvement of claim 2 in which the alkali metal is lithium.

5. In a process for producing carbon black from a fluid hydrocarbon by subjecting it to the thermal dissociation temperatures thereof while confined within an enclosed reaction zone, the improvement which comprises controlling important rubber properties, including modulus, of the carbon black produced by intimately contacting and homogeneously admixing said hydrocarbon while it is being subjected to said dissociation temperatures with between about 50 and about 20,000 parts by weight of alkali metal chosen from the group consisting of sodium and lithium per million parts of carbon black being produced therefrom, said concentration being continuously maintained at a uniform level which is directly related to the degree of adjustment needed in said rubber properties.

6. The improvement as described in claim 5 wherein the said hydrocarbon is heated to said dissociation temperatures by means of a combustion reaction conducted within said enclosed reaction zone.

7. The improvement as described in claim 5 wherein the said hydrocarbon is heated to said dissociation temperatures by means of radiation from hot refractory surfaces surrounding same.

8. The improvement as described in claim 5 wherein said alkali metal is supplied in chemically combined form.

9. The improvement as described in claim 8 wherein the said alkali metal is supplied in the form of an impure material containing same.

10. The improvement as described in claim 5 wherein said alkali metal is included in the hydrocarbon raw material used.

11. A process for making a modified furnace-type carbon black characterized by lower than normal modulus properties in rubbers, comprising introducing into a confined conversion space which is maintained at hydrocarbon cracking temperatures a fluid hydrocarbon and molecular oxygen containing gases in an amount regulated in proportion to the total supply of combustible reactants so as to maintain free carbon forming conditions in said conversion space and continuously delivering to said conversion space in such a manner as to contact said hydrocarbon intimately a substance comprising an alkali metal chosen from the group consisting of sodium and lithium in amounts sufficient to provide between about 100 and 20,000 parts by weight of said alkali metal per million parts by weight of the carbon black being produced therein, the extent to which said modulus properties are lowered being directly related to the proportion of said alkali metal provided.

12. A process as described in claim 11 in which the fluid hydrocarbon comprises a substantial fraction of normally liquid components.

13. A process as described in claim 12 in which the normally liquid hydrocarbon fraction includes a substantial portion of highly aromatic tars.

14. A process for making a modified thermal-type carbon black the rubber properties of which are desirably altered comprising flowing a fluid hydrocarbon raw material through a laterally enclosed reaction zone containing refractory checkerwork which has been thoroughly pre-heated to hydrocarbon cracking temperatures, in the absence of sufficient oxygen containing gases to prevent carbon formation, and simultaneously supplying in a continous manner to said reaction zone, a substance comprising an alkali metal chosen from the group consisting of sodium and lithium in amounts sufficient to provide, per million parts by weight of carbon black being produced between about 100 and about 20,000 parts by weight of said alkali metal, the extent to which said rubber properties are altered being directly related to the proportion of said alkali metal provided.

15. A process as described in claim 5 in which said alkali metal is supplied in chemically uncombined form.

16. The improvement as described in claim 5 wherein said alkali metal is supplied in the form of a dilute aqueous solution of a chemical compound containing said alkali metal.

References Cited in the file of this patent

UNITED STATES PATENTS

| | | |
|---|---|---|
| 1,438,032 | Frost | Dec. 5, 1922 |
| 2,617,714 | Arnold | Nov. 11, 1952 |
| 2,632,713 | Krejci | Mar. 24, 1953 |
| 2,794,709 | Kirkbridge | June 4, 1957 |
| 2,914,418 | Eastman | Nov. 24, 1959 |
| 2,922,709 | Hetzel | Jan. 26, 1960 |

OTHER REFERENCES

Gruse et al.: The Chemical Technology of Petroleum, pp. 29, 30, McGraw-Hill Book Co., N.Y., 1942.